United States Patent
Huybrechts et al.

(10) Patent No.: US 9,353,285 B2
(45) Date of Patent: May 31, 2016

(54) WATER-BASED TWO-COMPONENT COATING COMPOSITIONS

(71) Applicant: AXALTA COATING SYSTEMS IP CO., LLC, Wilmington, DE (US)

(72) Inventors: Jozef Theresia Huybrechts, Turnhout (BE); Wiebke Becker, Essen (DE); Kevin Cappan, Strombeek-Bever (BE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 0 days.

(21) Appl. No.: 14/401,717

(22) PCT Filed: Aug. 6, 2013

(86) PCT No.: PCT/US2013/053742
§ 371 (c)(1),
(2) Date: Nov. 17, 2014

(87) PCT Pub. No.: WO2014/025748
PCT Pub. Date: Feb. 13, 2014

(65) Prior Publication Data
US 2015/0166823 A1    Jun. 18, 2015

Related U.S. Application Data

(60) Provisional application No. 61/681,778, filed on Aug. 10, 2012.

(51) Int. Cl.
C09D 175/04 (2006.01)
C09D 153/00 (2006.01)
C08G 18/62 (2006.01)
C08G 18/63 (2006.01)
C08G 18/79 (2006.01)
C08G 18/08 (2006.01)

(52) U.S. Cl.
CPC ........ *C09D 153/005* (2013.01); *C08G 18/0823* (2013.01); *C08G 18/6254* (2013.01); *C08G 18/633* (2013.01); *C08G 18/792* (2013.01); *C09D 175/04* (2013.01)

(58) Field of Classification Search
None
See application file for complete search history.

(56) References Cited

U.S. PATENT DOCUMENTS

| 3,821,145 | A | * | 6/1974 | Walus ................ C09D 151/003 428/460 |
| 4,489,135 | A | | 12/1984 | Drexler et al. |
| 5,141,987 | A | | 8/1992 | Nachtkamp et al. |
| 5,401,795 | A | | 3/1995 | Brock et al. |
| 5,492,961 | A | | 2/1996 | Brock et al. |
| 5,552,496 | A | | 9/1996 | Vogt-Birnbrich et al. |
| 5,556,912 | A | | 9/1996 | Brock et al. |
| 5,635,559 | A | | 6/1997 | Brock et al. |
| 5,691,425 | A | | 11/1997 | Klein et al. |
| 5,854,337 | A | | 12/1998 | Wandelmaier et al. |
| 5,929,272 | A | | 7/1999 | Epple et al. |
| 6,455,600 | B1 | * | 9/2002 | Hahnle ................ A61L 15/425 521/63 |
| 2004/0034164 | A1 | | 2/2004 | Melchiors et al. |
| 2006/0014922 | A1 | | 1/2006 | Kohler et al. |
| 2009/0264587 | A1 | | 10/2009 | Blum et al. |

FOREIGN PATENT DOCUMENTS

| EP | 1671990 A2 | 6/2006 |
| WO | 0142328 A1 | 6/2001 |
| WO | 2005035482 A2 | 4/2005 |
| WO | 2007013684 A2 | 2/2007 |

OTHER PUBLICATIONS

ISA EPO, International Search Report and Written Opinion for International Application No. PCT/US2013/053742, dated Nov. 19, 2013.

* cited by examiner

*Primary Examiner* — Robert S Loewe
(74) *Attorney, Agent, or Firm* — Ingrassia Fisher & Lorenz, P.C.

(57) ABSTRACT

A water-based coating compositions including:
at least one cross-linkable water-reducible binder having acid functional groups and
functional groups with active hydrogen, at least one polyisocyanate cross-linking agent with free isocyanate groups, and
water and optionally at least one organic solvent.
The acid functional groups of the at least one water-reducible binder are at least partly neutralized with at least one neutralizing agent, the neutralizing agent including a monoamine having a secondary amino group attached to a tertiary carbon atom. The monoamine is preferably a reaction product of at least one monoamine having a primary amino group attached to a tertiary carbon atom and a mono-epoxide, or a reaction product of at least one monoamine having a primary amino group attached to a tertiary carbon atom and a mono-unsaturated compound.

20 Claims, No Drawings

WATER-BASED TWO-COMPONENT COATING COMPOSITIONS

CROSS-REFERENCE TO RELATED APPLICATIONS

This application is a U.S. National-Stage entry under 35 U.S.C. §371 based on International Application No. PCT/US2013/053742, filed Aug. 6, 2013, which was published under PCT Article 21(2) and which claims priority to U.S. Provisional Application No. 61/681,778, filed Aug. 10, 2012, which are all hereby incorporated in their entirety by reference.

TECHNICAL FIELD

An exemplary embodiment relates to water-based two-component coating compositions which contain neutralized cross-linkable binders and cross-linking agents.

BACKGROUND

Due to its VOC-reduced character water-based two-component coating compositions based on a binder component and a polyisocyanate cross-linking agent are widespread in industrial and vehicle coating, in particular also in vehicle repair coating. Those coating compositions usually contain binder components with functional groups containing active hydrogen, for example hydroxyl groups. The coating compositions have similar good technological properties as their solvent-borne counter parts, even if some deficiencies still need to be overcome.

Typically the hydroxyl-functional components are based on anionically stabilized polymer dispersions neutralized with volatile or partly volatile amines. In particular for use in vehicle repair coating, a short drying time of the coating at moderate temperatures, for example from room temperature up to approx. 60° C., is desired.

EP 1391469 discloses aqueous binder dispersions containing carboxy-functional copolymers neutralized with triethanolamine as a non-volatile reactive neutralizing amine. In such compositions the triethanolamine can crosslink with the other components of the binder, but the final network contains N-carbon bonds that are prone to yellowing and may hurt durability.

In addition it is known to use reactive diluents with sterically hindered amino groups to reduce curing time. For example, WO 2005/035482 discloses aspartates prepared from primary amines and maleates and their use as reactive components in two-component polyurethane coating compositions, and EP 1616889 discloses hydrophilic polyaspartic esters for use in aqueous two-component coating compositions. However, use of aspartates in two-component coating compositions generally leads to a remarkable reduction in pot life, i.e. a reduction in the time within which the coating composition can still satisfactorily be processed or applied.

Furthermore, it is known to use epoxide-amine-adducts with sterically hindered amino groups as binders with polyisocyanate cross-linkers in two-component coating compositions. For example, EP 0741158 discloses mixtures of hydroxy-functional copolymers and epoxide-amine-adducts having a mass fraction of at least 20% of aliphatic epoxide and/or amine units which comprise at least one tertiary or quaternary carbon atom, as binders for coating compositions and reactive components in adhesives. WO 01/42328 also discloses hindered amine adducts with tertiary alkyl groups as binders for polyurea coating systems. There is no teaching in above two applications to use the binders as neutralizing agents in water borne 2K compositions that are anionically stabilized.

There is accordingly still a requirement for water-based two-component coating compositions, based on a binder component with functional groups containing active hydrogen and polyisocyanate cross-linking agents, which combine an adequate pot-life with a short drying time even at moderate temperatures of for example room temperature or 40° C. to 60° C. Also, the formulation of coating compositions with lower VOC at acceptable spraying viscosities should be possible. The water-based coating compositions should here yield coatings with very good technological properties, such as for example very good hardness and resistance to chemicals and water, and excellent optical appearance. The paint films should be high gloss and brilliant.

SUMMARY

An exemplary embodiment relates to water-based two-component coating compositions which contain water-reducible binders having functional groups containing active hydrogen and polyisocyanate cross-linking agents, wherein non-volatile reactive amines are used as neutralizing agents for the binders.

An exemplary embodiment is therefore directed to water-based coating compositions comprising:
at least one water-reducible binder having acid functional groups and functional groups with active hydrogen,
at least one polyisocyanate cross-linking agent with free isocyanate groups, and
water and optionally at least one organic solvent,
wherein the acid functional groups of the at least one water-reducible binder are at least partly neutralized with a neutralizing agent, the neutralizing agent comprising a monoamine having a secondary amino group attached to a tertiary carbon atom.

An exemplary embodiment is also directed to an aqueous binder dispersion, comprising at least one water-reducible binder having acid functional groups and functional groups with active hydrogen, wherein the acid functional groups of the at least one water-reducible binder are at least partly neutralized with a neutralizing agent, the neutralizing agent comprising a monoamine having a secondary amino group attached to a tertiary carbon atom.

Preferably the monoamine is a reaction product of at least one monoamine having a primary amino group attached to a tertiary carbon atom and a mono-unsaturated compound, or a reaction product of at least one monoamine having a primary amino group attached to a tertiary carbon atom with a monoepoxide.

It has been found that the water-based coating compositions of an exemplary embodiment have an excellent balance of pot-life, drying time and appearance while allowing the formulation of compositions with low VOC at acceptable spraying viscosities.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

These and other features and advantages of exemplary embodiments will be more readily understood, by those of ordinary skill in the art, from a reading of the following detailed description. It is to be appreciated those certain feature of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The term (meth)acrylic as used here and hereinafter should be taken to mean methacrylic and/or acrylic.

Unless stated otherwise, all the molar mass data, number-average molar mass data Mn or weight-average molar mass data Mw stated in the present description are molar masses determined or to be determined by gel permeation chromatography (GPC; divinylbenzene-crosslinked polystyrene as the immobile phase, tetrahydrofuran as the liquid phase, polystyrene standards).

The coating compositions according to an exemplary embodiment are water-based coating compositions comprising binders, cross-linkers and a liquid carrier. The liquid carrier is water and may comprise in addition one or more organic solvents.

Water-based coating compositions are coating compositions, wherein water is used as solvent or thinner when preparing and/or applying the coating composition. Usually, water-based coating compositions contain about 20 to about 80% by weight of water, based on the total amount of the coating composition and optionally, up to about 15% by weight, preferably, below about 10% by weight of organic solvents, based on the total amount of the coating composition.

The pot life is the time within which, once the mutually reactive components of a coating composition have been mixed, the coating composition may still be properly processed or applied and coatings of unimpaired quality can be achieved.

The coating compositions according to the invention are two-component coating compositions. The handling of two-component coating compositions generally requires mixing together the reactive components shortly before application to avoid premature reaction of the reactive components. The term "shortly before application" is well-known to a person skilled in the art working with two-component coating compositions. The time period within which the ready-to-use coating composition may be prepared prior to the actual use/application depends, e.g., on the pot life of the coating composition. Therefore, a sufficient long pot life is desired in order to have a comfortable time window for preparing/mixing and applying the two-component coating compositions.

The water-based coating compositions according to the invention comprise water-reducible binders having acid functional groups and functional groups with active hydrogen and polyisocyanate cross-linking agents with free isocyanate groups.

The water-reducible binders having acid functional groups and functional groups with active hydrogen and polyisocyanate cross-linking agents with free isocyanate groups which are reactive with each other shall be stored separately and mixed together only shortly before application. Usually the coating compositions of an exemplary embodiment comprise about 20 to about 80% by weight solids, preferably about 30 to about 70% by weight solids of the at least one water-reducible binder and about 20 to about 80% by weight solids, preferably about 30 to about 70% by weight solids of the at least one polyisocyanate cross-linking agent, relative to the entire coating composition.

The water-reducible binder of the coating composition according to an exemplary embodiment comprises compounds with functional groups with active hydrogen, which are reactive towards isocyanate groups of cross-linking agent. These compounds can be oligomeric or polymeric binders. The binders are compounds with a number average molar mass (Mn) of, e.g., about 800 to about 500,000 g/mole, preferably of about 1100 to about 300,000 g/mole. The functional groups with active hydrogen may be for example hydroxyl groups, thiol groups, primary and/or secondary amino groups or combinations thereof. Compounds with hydroxyl groups are preferably used as the water-reducible binder.

Examples of useful water-reducible binders are described in the following.

The binders with hydroxyl groups are for example the polyurethanes, (meth)acrylate copolymers, polyesters, polyethers and other binders, known from polyurethane chemistry to the skilled person, which are used in the formulation of water-based coating compositions. They may each be used individually or in combination with one another.

Examples of suitable polyurethane resins include all polyurethane resins which are suited for water-based coating compositions and known to a skilled person. Examples are polyurethane resins, for example, with a number average molar mass Mn of about 500 to about 500 000 g/mol, preferably, of about 1100 to about 300 000 g/mol, most preferably, of about 5000 to about 300 000 g/mol, an acid value of about 10 to about 100 mg KOH/g, preferably of about 20 to about 80 mg KOH/g, and a hydroxyl value of about 0 to about 400 mg KOH/g, preferably, of about 80 to about 250 mg KOH/g. Appropriate polyurethane resins which may be used are, for example, prepared by reacting compounds which are reactive with respect to isocyanate groups and polyisocyanates having at least 2 free isocyanate groups per molecule Polyols of high molecular weight can be used as compounds which are reactive with respect to isocyanate groups, preferably, polyester polyols, polyether polyols and/or polycarbonate polyols with a molecular weight of, for example, 500-6000 g/mol. Polyols of low molecular weight with a molecular weight of about 60 to about 400 g/mol can also be co-used. Aliphatic, aromatic and/or cycloaliphatic diisocyanates can preferably be used as polyisocyanates. Examples of useful polyisocyanates are phenylene diisocyanate, xylylene diisocyanate, diphenylmethane diisocyanate, isophorone diisocyanate, dicyclohexylmethane diisocyanate, tetramethylene diisocyanate, hexamethylene diisocyanate, trimethyl hexamethylenediisocyanate.

The thus obtained polyurethane resins can still be subjected to chain extension to increase the molar mass. For example, NCO-functional polyurethane prepolymers can be reacted with compounds, which are reactive with respect to isocyanate groups. Compounds, which are reactive with respect to isocyanate groups, are in particular compounds with hydroxyl and/or secondary and/or primary amino groups. OH-functional polyurethane prepolymers can be chain extended for example with polyisocyanates The polyurethane resins prepared with this process can be partly or fully microgel in processes where there is a chain extension reaction with di- and or polyamines leading to urea functional groups.

The polyurethane resins include such resins which are in modified form, for example, as silicon-modified or (meth)acrylated polyurethane resins. Examples of polyurethane resins which may be used are described in U.S. Pat. Nos. 5,492, 961, 5,141,987, 5,556,912, DE-A-41 15 042, U.S. Pat. Nos. 5,635,559, 5,691,425, DE-A-42 28 510, U.S. Pat. Nos. 5,854, 337 and 4,489,135.

Examples of hydroxyl-functional poly(meth)acrylate resins include all poly(meth)acrylate resins which are suited for water-based coating compositions and known to a skilled person. For example, they can be those with a number average molar mass Mn of about 1000 to about 20000 g/mol, preferably, of about 1100 to about 15000, an acid value of about 10 to about 100 mg KOH/g, preferably, of about 15 to about 50 and a hydroxyl value of about 40 to about 400 mg KOH/g, preferably, of 60-250 mg KOH/g.

The poly(meth)acrylate copolymer can be prepared by free-radical polymerization of polymerizable, olefinically unsaturated monomers, optionally, in presence of oligomeric or polymeric polyester and/or polyurethane resins. Free-radically polymerizable, olefinically unsaturated monomers, which may be used are monomers which, in addition to at least one olefinic double bond, also contain further functional groups and monomers which, apart from at least one olefinic double bond, contain no further functional groups. Further functional groups may be, for example, urea, hydroxyl, carboxyl, sulfonic acid, silane, amine, amide, acetoacetate, phosphoric, phosphonic, heterocyclic or epoxy groups. It would be clear that only those functional groups can be combined in the poly(meth)acrylate copolymer which do not tend to self-crosslink.

Olefinically unsaturated monomers with hydroxyl groups are used to introduce hydroxyl groups into the (meth)acrylic copolymers. Suitable hydroxy-functional unsaturated monomers are, for example, hydroxyalkyl esters of alpha, beta-olefinically unsaturated monocarboxylic acids with primary or secondary hydroxyl groups. These may, for example, comprise the hydroxyalkyl esters of acrylic acid, methacrylic acid, crotonic acid, maleic acid, fumaric acid, itaconic acid and/or isocrotonic acid. The hydroxyalkyl esters of (meth) acrylic acid are preferred. Further olefinically unsaturated monomers with hydroxyl groups may, of course, also be used.

Carboxyl functional olefinically unsaturated monomers are used to introduce carboxyl groups into the (meth)acrylic copolymers. Examples of suitable olefinically unsaturated carboxylic acids include acrylic acid, methacrylic acid, crotonic acid and isocrotonic acid, itaconic acid, maleic acid, fumaric acid and the halfesters of the difunctional acids. Acrylic and methacrylic acid are preferred.

Unsaturated monomers which, apart from at least one olefinic double bond, contain no further functional groups are, for example, aliphatic esters of olefinically unsaturated carboxylic acids, such as (meth)acrylic acid, vinyl esters and/or vinylaromatic hydrocarbons such as styrene.

Also, other additional unsaturated monomers, which contain apart from an olefinic double bond further functional groups can be used.

Examples of polyester resins which can be used as the water-reducible binder include all polyester resins which are suited for water-based coating compositions, for example, hydroxyfunctional polyesters with a number average molar mass of about 500 to about 10,000 g/mol, preferably, of about 1100 to about 8000 g/mol, an acid value of about 10 to about-150 mg KOH/g, preferably, of about 15 to about 50 mg KOH/g and a hydroxyl value of about 40 to about 400 mg KOH/g, preferably, of about 50 to about 200 mg KOH/g. The polyesters may be saturated or unsaturated and they may optionally be modified with fatty acids. The polyesters are produced using known processes with elimination of water from polycarboxylic acids and polyalcohols.

Also, thiol-functional water-reducible binder can be used in the coating composition according to the invention. The thiol group of the thiol-functional water-reducible binder can be covalently attached to a resin.

In order to ensure sufficient water dilutability of the water-reducible binders these binders are modified to render them hydrophilic. The water-reducible binders are anionically modified by incorporation of acid groups. Acid-functional water-reducible binders can contain carboxylic acid groups, sulfonic, phosphonic and/or phosphoric acid groups. Carboxylic acid groups are most preferred. Water-reducible binders can have acid values of about 10 to about 150 mg KOH/g, preferably of about 20 to about 80 mg KOH/g. The anionic modification can be combined with non-ionic modification. Also, emulsifiers can be used in addition to the modification with acid groups.

The compounds A) can be used individually or in combination.

The acid functional groups of the at least one water-reducible binder, preferably the carboxyl groups, are at least partly neutralized with a neutralizing agent as defined above. Preferably the acid groups of the water-reducible binders are neutralized with said neutralizing agent according to a neutralization degree of about 20 to about 200%, more preferred of about 60 to about 140%.

Preferably the above defined monoamine neutralizing agent is a reaction product of at least one monoamine having a primary amino group attached to a tertiary carbon atom and an mono-unsaturated compound, or a reaction product of at least one monoamine having a primary amino group attached to a tertiary carbon atom with a monoepoxide.

The monoamines having a primary amino groups attached to a tertiary carbon atom, may contain one or more, e.g., two or three hydroxyl groups. They can have, for example, a number average molecular weight of about 73 to about 1000. They can contain, for example 4 to 30 carbon atoms in the molecule.

Examples of suitable monoamines are tert. butylamine, 2,2' dimethylbutylamine, 2'2-dimethylpentylamine Examples of suitable monoamines with hydroxyl groups are 2-amino-2-methyl-1-propanol, 2-amino-2-ethyl-1,3-propanediol and trishydroxymethyl aminomethane. Those monoamines are also commercially available, for example, under the trade name AMP 90, AEPD, TrisAmino from Dow and T300 from Hopax.

According to one embodiment the monoamine neutralizing agents can be prepared by reaction of the above defined monoamines having a primary amino group attached to a tertiary carbon atom with at least one monoepoxy compound. The monoepoxy compounds are preferably aliphatic and cycloaliphatic monoepoxides. The monoepoxy compounds can have, for example, a number average molecular weight of about 44 to about 800, preferably of about 44 to about 250. They can contain, for example, 2 to 33 carbon atoms in the molecule.

For example, aliphatic, aromatic or cycloaliphatic monoepoxides with 2 to 33 carbon atoms in the molecule can be used. Examples of monoepoxides are ethyleneoxide, propyleneoxide, butyleneoxide and cyclohexaneepoxide. Further monoepoxide compounds to be used are monoglycidyl esters or monoglycidyl ether. Examples of suitable monoglycidyl ethers are the glycidyl ethers of monoalcohols, e.g. of methanol, n- and t-butanol, 2-ethylhexylalcohol, dodecanol, cyclohexanol, phenol and t-butylphenol.

Examples of suitable monoglycidyl esters are glycidyl esters of monocarboxylic acids, e.g. monocarboxylic acids containing . . . 8. to 30 . . . carbon atoms in the molecule.

Suitable examples of glycidyl esters of monocarboxylic acids are those containing at least one tertiary carbon atom in the molecule. Glycidyl esters of monocarboxylic acids containing at least one tertiary carbon atom in the molecule are glycidyl esters of alpha-alkyl alkane monocarboxylic acids and alpha,alpha-dialky alkane monocarboxylic acids, for example with 5 to 13 carbon atoms in the acid molecule. Examples of those glycidyl esters are those from branched fatty acids as Versatic acid 5, 9 and 10 known under the trade name Cardura® E5, E9 and E10 from Momentive Specialty Chemicals.

The monoepoxy compounds can be used alone or in combination with each other.

According to another embodiment the monoamine neutralizing agents can be prepared by reaction of the above defined monoamines having a primary amino group attached to a tertiary carbon atom with at least one mono-unsaturated compound, preferably an olefinically mono-unsaturated compound. The mono-unsaturated compound can be any compound which is capable of reacting with the primary monoamine by forming a Michael addition product. Examples of suitable mono-unsaturated compounds are acrylates, methacrylates, maleates, fumarates and itaconates. More specifically examples of suitable mono-unsaturated compounds are the esters of acrylic acid, methacrylic acid, maleic acid, fumaric acid and itaconic acid with mono-alcohols having 4 to 30 carbon atoms in the molecule.

The mono-unsaturated compounds can be used alone or in combination with each other.

According to yet another embodiment the monoamine neutralizing agents can be prepared by reaction of mono-unsaturated compounds such as isobutylene and other branched olefins with ammonia.

Generally the above defined neutralizing agents contain at least one reactive group, i.e. the secondary amino group attached to a tertiary carbon atom. Preferably the above defined monoamine neutralizing agents contain at least two reactive groups, i.e. at least one further reactive group besides the secondary amino group attached to a tertiary carbon atom. The at least one further reactive group can be, for example, a primary, secondary or tertiary hydroxyl group. Preferably the above defined monoamine neutralizing agents have a number average molecular weight of about 117 to about 1000. The above defined monoamine neutralizing agents may have a solubility in water of at least about 5% at about 20° C., i.e. at least about 5 g of the neutralizing agent are soluble in about 95 g of water by forming a fully transparent solution.

The above defined neutralizing agents can be used alone or in combination with each other, optionally together with other neutralizing agents. The neutralizing agent preferably consists of said monoamine or a combination of said monoamines having a secondary amino group attached to a tertiary carbon atom.

According to a particularly preferred embodiment the neutralizing agent comprises or consists of 2-(tert-butylamino) ethanol.

The monoamine neutralizing agents, in particular the epoxide-amine adducts can be prepared according to processes well known to a person skilled in the art. For example, epoxide-amine adducts can be prepared by addition reaction of the monoamine to the monoepoxide at elevated temperatures of, e.g., about 50 to about 150° C. A catalyst may be used for the reaction. Suitable reaction products of monoamines having a secondary amino group attached to a tertiary carbon atom and a mono-unsaturated compound may be prepared through aza Michael addition reactions.

The neutralizing agents as used in an exemplary embodiment are non-volatile reactive neutralizing agent, i.e. they are able to participate in the curing reaction with the polyisocyanate cross-linking agent, but do not lead to an undesirable reduction of pot life.

Other neutralizing agents may be used in addition to the above defined monoamine neutralizing agents.

The coating compositions, according to the invention contain polyisocyanates with free isocyanate groups as cross-linking agents. Examples of the polyisocyanates are any number of organic di- or higher functional isocyanates with aliphatically, cycloaliphatically, araliphatically and/or aromatically bound free isocyanate groups. The polyisocyanates are liquid at room temperature or become liquid through the addition of organic solvents. At about 23° C., the polyisocyanates generally have a viscosity of about 1 to about 6,000 mPas, preferably, of about 5 to about 3,000 mPas. The preferred polyisocyanates are polyisocyanates or polyisocyanate mixtures with exclusively aliphatically and/or cycloaliphatically bound isocyanate groups with an average NCO functionality of about 1.5 to about 5, preferably about 2 to about 4. Examples of particularly suitable polyisocyanates are what are known as "paint polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the derivatives known per se, containing biuret, allophanate, urethane and/or isocyanurate groups of these diisocyanates which, following production, are freed from surplus parent diisocyanate, preferably by distillation, with only a residue content of less than about 0.5% by weight. Triisocyanates, such as, triisocyanatononan can also be used.

Sterically hindered polyisocyanates are also suitable. Examples of these are 1,1,6,6-tetramethyl-hexamethylene diisocyanate, 1,5-dibutyl-penta-methyldiisocyanate, p- or m-tetramethylxylylene diisocyanate and the appropriate hydrated homologues.

In principle, diisocyanates can be converted by the usual method to higher functional compounds, for example, by trimerization or by reaction with water or polyols, such as, for example, trimethylolpropane or glycerine. The polyisocyanates can also be used in the form of isocyanate-modified resins.

Also, hydrophilic polyisocyanates may be used. Hydrophilic polyisocyanates are any polyisocyanates that have been modified with hydrophilic groups, particularly with chemically incorporated hydrophilic groups, which takes care that the polyisocyanate is water dispersible. Hydrophilic groups to be used to modify the polyisocyanates can be ionic, in particular anionic hydrophilic groups and/or nonionic hydrophilic groups. An anionic modification may be obtained, for example, by incorporating carboxyl groups, sulfonic acid groups and/or phosphonic acid or phosphoric acid groups into the polyisocyanate. A non-ionic modification may be obtained, for example, by incorporating polyethylene oxide units.

The polyisocyanate cross-linking agents can be used individually or in combination.

The polyisocyanate cross-linking agents are those commonly used in the paint industry, and are described in detail in the literature and are also obtainable commercially.

The molar ratio of groups reactive towards functional groups of the cross-linking agent, in particular the thiol and/or hydroxyl groups from the at least one water-reducible binder to the isocyanate groups of the at least one polyisocyante cross-linking agent, is for example, about 0.5:1 to 3:1, in particular about 0.7:1 to 2:1.

The coating compositions according to the invention have a solids content of, for example, about 10 to about 85 wt. %, preferably about 35 to about 75 wt. %.

The water-based coating compositions, according to the invention, contain furthermore water and optionally at least one organic organic solvent. The water-based coating compositions contain, for example, about 30 to about 70% by weight of water, and possibly small amounts of organic solvents, e.g., up to about 15% by weight, preferably, up to about 10% by weight based on the entire coating composition.

The organic solvents are solvents conventionally used in coating techniques. These may originate from the preparation of the binders or are added separately. Examples of suitable solvents are monohydric or polyhydric alcohols, e.g., propanol, butanol, hexanol; glycol ethers or esters, for example, diethylene glycol dialkyl ether, dipropylene glycol dialkyl ether, each with $C_1$- to $C_6$-alkyl, ethoxypropanol, butyl glycol; glycols, for example, ethylene glycol, propylene glycol, and ketones, e.g., methyl ethyl ketone, acetone, cyclohexanone; N-methylpyrrolidone, N-ethylpyrrolidone, aromatic or aliphatic hydrocarbons, for example, toluene, xylene, or straight-chain or branched aliphatic C6-C12-hydrocarbons. Water-miscible organic solvents are preferred.

The coating compositions, according to the invention, can contain pigments, fillers and/or usual coating additives. All colour and/or special effect-giving pigments of organic or inorganic type used in paints are suitable for pigments. Examples of inorganic or organic colour pigments are titanium dioxide, micronized titanium dioxide, iron oxide pigments, carbon black, azo pigments, phthalocyanine pigments, quinacridone or pyrrolopyrrole pigments. Examples of special effect pigments are metal pigments, for example, from aluminum or copper, interference pigments, such as, for example, aluminum coated with titanium dioxide, coated mica, graphite effect pigments and iron oxide laminae Examples of fillers are silicon dioxide, barium sulfate, talcum, aluminum silicate and magnesium silicate.

The additives are additives usually used in the paint industry. Examples of such additives are light stabilizers, for example, based on benztriazoles and HALS (hindered amine light stabilizer) compounds, flow control agents based on (meth)acrylic homopolymers or silicon oils, rheology-influencing agents, such as, highly disperse silicic acid or polymeric urea compounds, thickeners, such as, cross-linked polycarboxylic acid or polyurethanes, anti-foaming agents, wetting agents, photoinitiators. The additives are added in the usual amounts familiar to the person skilled in the art. Also, curing catalysts for the cross-linking reaction can be used, for example, in amounts of, e.g., up to about 0,5% by weight based on the total coating composition. Generally, suitable catalysts are basic catalysts. Examples are inorganic basic compounds, such as hydroxides and basic oxides of metals. Suitable examples of hydroxides of metals are sodium, potassium, calcium and magnesium hydroxide. Also, quaternary ammonium hydroxides, such as tetraethyl ammonium hydroxide, can be used. Furthermore, amines can be used as catalyst. Suitable amines that can be used are secondary monoamines, for example, morpholine, diethyl amine, dibutyl amine, N-methyl ethanol amine, diethanol amine, and diisopropanol amine. Also suitable are diamines and polyamines Tertiary amines are a particularly suitable class of basic catalysts. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, triethanol amine, N-ethyl diethanol amine, N-butyl diethanol amine, N,N-dibutyl ethanol amine, and N-ethyl morpholine. Also suitable are 1,4-diazabicyclo[2.2.2]octane (DABCO), 1,8-diazabicyclo[5.4.0]undec-7-ene (DBU), 1,5-diazabicylo [4.3.0]non-5-ene, guanidine, guanine, guanosine, melamine, and mixtures and derivatives thereof.

In case of hydroxyl-functional components A) tin catalysts and tertiary amines are most preferred catalysts. Examples of tin catalysts are organotin carboxylates, e.g. dialkyl tin carboxylates of aliphatic carboxylic acids, such as dibutyl tin dilaurate (DBTL). Also, tertiary amines are preferred catalysts, for example, the tertiary amines mentioned above. In particular suitable are N,N-dimethyl ethanol amine, 1,4-diazabicyclo[2.2.2]octane (DABCO) and 1,8-diazabicyclo [5.4.0]undec-7-ene (DBU).

An exemplary embodiment is also directed to an aqueous binder dispersion, comprising at least one water-reducible binder having acid functional groups and functional groups with active hydrogen, wherein said acid functional groups are at least partly neutralized with a neutralizing agent, as defined above. The water-reducible binder of the aqueous binder dispersion are the same as described above as water-reducible binder A) with the corresponding neutralizing agent. The acid groups, preferably the carboxylic acid groups are neutralized with the above described neutralizing agents, for example, according to a neutralization degree of about 20 to about 200%, preferably of about 60 to about 140%. Other neutralizing agents may be used in addition to the above defined monoamine neutralizing agents.

The aqueous binder dispersion is prepared according to methods known to a person skilled in the art, for example, by preparing the binder in an organic phase and by converting it, after or during at least partial neutralization of the acid groups of the binder, into an aqueous phase.

The coating compositions of an exemplary embodiment may be used in automotive coating, for example for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or a single stage top coat layer or in pigment-free form for the production of an outer clear top coat layer or a transparent sealing layer of a multilayer coating. They may, for example, be used as a clear coat coating composition for the production of a clear top coat layer on a previously applied color-imparting and/or special effect-imparting pre-dried base coat layer.

The coating compositions may be applied by means of conventional application methods, in particular, by spraying onto any desired uncoated or pre-coated substrates, for example, of metal or plastics. Once applied, layers of the coating compositions according to the invention may initially be flashed off to remove water and optionally present organic solvent, for example. Curing may then proceed at ambient temperature or thermal curing may proceed at temperatures of, for example, about 40 to about 220° C., for example, by baking or irradiating with IR radiation (IR=Infra Red) for about 5 to about 30 minutes. Radiating with IR radiation can be carried out with usual IR dryers, for example for about 3 to about 6 minutes at a distance IR dryer/object surface of about 50 to about 80 cm.

Therefore, an exemplary embodiment also relates to a process for preparing a coating layer, comprising the steps:
1) applying a coating layer from a water-based coating composition as defined above, and
2) curing the coating layer.

Optionally, the applied coating layer may be flashed off to remove water and organic solvent, if present.

It was surprising that a sufficient long pot-life and simultaneously fast curing could be achieved, while obtaining coatings with excellent appearance, e.g. coatings with high gloss and brilliance and without surface defects. Coating compositions, for example, clear coat compositions, could be formulated with a high solids content.

Also, an early hardness development has been observed.

EXAMPLES

Example 1

Preparation of Binder Component A
1. Preparation of a Macromonomer

In a reactor (equipped with a propeller type of stirrer, a thermometer, condensor and monomer/initiator feeding system) 0.01 grams of a BF2 bridged Co (II) complex of (1.2-diphenyl-1,2-dioxoiminoethane)2 (H2O)2 dissolved in 311.79 grams of methylethyl ketone (MEK) were loaded and heated to about 80° C. under a nitrogen purge.

A monomer/solvent mixture of 98.47 grams of MEK, 223.61 grams of methyl methacrylate (MMA), 120.4 grams of 2-hydroxyethyl methacrylate (HEMA) and 86 grams of methacrylic acid (MAA) were added through an addition funnel in two steps: (1) 20% as a shot; (2) the remaining 80% over a period of 3 hours.

0.05 grams of a $BF_2$ bridged Co (II) complex of (1.2-diphenyl-1,2-dioxoiminoethane)$_2$ $(H_2O)_2$, 7.74 grams of Vazo 52 (from DuDont de Nemours) dissolved in 128.79 grams of methylethyl ketone (MEK) were added through an addition funnel in two steps to the reactor:
(1) 20% over about 20 minutes after the addition of the 20% monomer/solvent mixture from previous step,
(2) the remaining 80% over a period of 3 hours and 30 min starting the feed at the same time as the start of monomer/solvent mixture addition.

The addition funnels were rinsed with 27.2 grams of MEK after the feeds, the reactor contents kept for about 30 min at reflux before diluting with 33.1 grams of MEK.

The test results are within below specifications:
Solids content: 37-39% (determined at 105° C. for 1 hour)
Acid value: 136-145 mg KOH/g solids
Mn/Mw=2000/3000 to 2600/3500
2. Preparation of a Graft Copolymer In a reactor equipped with a propeller type of stirrer, a thermometer, condensor and monomer/initiator feeding system 255.8 grams of macromonomer prepared in step 1 were loaded and heated at reflux. A mixture of 28 grams of dipropyleneglycol monobutyl ether, 100 grams of styrene (S), 96 grams of hydroxypropyl methacrylate (HPMA) and 94 grams of 2-ethylhexyl methacrylate (EHMA), 5 grams of t-butyl peroxi 2-ethylhexanoate (Trigonox 21) were added through an addition funnel over a 3 hours period and the reactor contents hold at reflux for about 30 minutes.

Then 1 gram of t-butyl peroxi 2-ethylhexanoate (Trigonox 21) dissolved in 3 grams of di-propyleneglycol monobutyl ether were added in three equal portions as a shot followed each time by a hold period at reflux for 1 hour.

Example 1A

Comparative Examples 1B,C,D not Using a Neutralizing Amine According to the Invention The MEK in 44.7 parts of the graft polymer prepared in step 2 were stripped-off under vacuum. Then the graft polymer was neutralized with an amine according to the invention (example 1A). Deionized water was added to disperse the graft polymer. For comparison different prior art amines have been used as neutralizing agents (comparative examples 1B, C, D).

|  | Example 1 | | | |
|---|---|---|---|---|
|  | A | B (comp.) | C (comp.) | D (comp.) |
| Graft copolymer | 44.7 | 44.7 | 44.7 | 44.7 |
| Dimethylethanolamine |  | 2.5 |  |  |
| T-Butylaminoethanol | 3.3 |  |  |  |
| T-Butylamine |  |  | 2.05 |  |
| Aminomethylpropanol (90% in water) |  |  |  | 2.77 |
| Deionized water | 52.0 | 52.8 | 53.25 | 52.53 |
| Total | 100 | 100 | 100 | 100 |

The test results can be seen in the table below.

| Neutralizing amine | Example | Solids (%) | Viscosity (cps) | AN | pH |
|---|---|---|---|---|---|
| t-butylaminoethanol | A | 35.85 | 145 | 46.3 | 9.3 |
| dimethyl ethanolamine | B | 37.20 | 220 | 46.8 | 9.6 |
| t-butylamine | C | 35.10 | 100 | 46.9 | 9.9 |
| aminomethylpropanol (90% in water) | D | 35.97 | 140 | 45.3 | 9.8 |

Example 2

Preparation of Binder Component B

In a reactor equipped with a propeller type of stirrer, a thermometer, condensor and monomer/initiator feeding system 255.8 grams of macromonomer of prepared in step 1 of example 1 were loaded and heated at reflux. A mixture of 28 grams of dipropyleneglycol monobutyl ether, 100 grams of styrene (S), 96 grams of hydroxypropyl methacrylate (HPMA) and 94 grams of 2-ethylhexyl methacrylate (EHMA), 5 grams of t-butyl peroxi 2-ethylhexanoate (Trigonox 21) were added through an addition funnel over a 3 hours period and the reactor contents hold at reflux for about 30 minutes.

Then 1 gram of t-butyl peroxi 2-ethylhexanoate (Trigonox 21) dissolved in 3 grams dipropyleneglycol monobutyl ether were added in three equal portions as a shot followed each time by a hold period at reflux for 1 hour.

Example 2A

Comparative Examples 2B, C,D,E

The MEK in 44.7 parts of the graft copolymer example were stripped-off under vacuum. Then the graft polymer was neutralized with an amine according to the invention (example 2A). Deionized water was added to disperse the graft polymer. For comparison different prior art amines have been used as neutralizing agents (comparative examples 2B, C, D, E).

|  | Example 2 | | | | |
| --- | --- | --- | --- | --- | --- |
|  | A | B | C | D | E |
| Prepolymer | 50.211 | 50.211 | 50.211 | 50.211 | 50.211 |
| Dimethylethanolamine |  | 2.110 |  |  |  |
| Diethanolamine |  |  |  |  |  |
| N-Butylaminoethanol |  |  |  |  | 2.77 |
| T-Butylaminoethanol | 2.78 |  |  |  |  |
| T-Butylamine |  |  | 1.73 |  |  |
| Aminomethylpropanol |  |  |  | 2.34 |  |
| 90% water |  |  |  |  |  |
| Deionized water | 47.009 | 47.679 | 48.059 | 47.449 | 47.019 |
| Total | 100 | 100 | 100 | 100 | 100 |

The test results can be seen in the table below.

| Neutralizing amine | Example 2 | Solids (%) | Viscosity (cps) | AN | pH |
| --- | --- | --- | --- | --- | --- |
| Dimethylethanolamine | B | 40.15 | 3200 | 37.8 | 9.0 |
| N-Butylaminoethanol | E | 39.95 | 3500 | 38.0 | 9.1 |
| T-Butylaminoethanol | A | 40.80 | 2200 | 37.8 | 9.1 |
| T-Butylamine | C | 39.45 | 3400 | 36.7 | 8.7 |
| Aminomethylpropanol | D | 39.95 | 3900 | 38.3 | 9.1 |

Paint Examples

Paint Example 1

Preparation of Clear Coat Compositions Based on Graft Copolymer of Example 1

100 parts of each graft copolymer dispersion (example 1A,B,C,D) were blended, by mechanical mixing, with a polyisocyanate curing agent (equivalent ratio NCO:OH=1.1/1). The polyisocyanate curing agent is a solution prepared by mixing 40 parts of n-butylglycolacetate and 60 parts of Desmodur® N3900 (1,6-hexamethylenediisocyanate trimer, 100% solids, from Bayer). The mixtures were diluted to spray viscosity (22-27 seconds) with de-mineralised water. The final clear coat composition had a solid content of about 38% (DIN EN ISO 2431 DIN 4 cup, 20° C.).

The clear coat compositions were sprayed on glass panels. The clear coat compositions were applied at 45% relative humidity at 22° C. in a wedge with a Devilbiss HVLP spray gun (GTI 110-trans Tech), nozzle 1.6, with suction feed. After application of the clear coat compositions, the panels were flashed off for 30 minutes followed by drying at room temperature or baking for 30 minutes at 60° C. The development of Persoz hardness of the resulting coatings was followed up at 40 micron dry film thickness.

TABLE

Persoz hardness for paint example 1, curing 30 minutes at 60° C.

| | Paint example with resin example 1 | | | |
| --- | --- | --- | --- | --- |
| | A Comp | B Comp | C Comp | D Comp |
| spray viscosity | 27" | 26" | 25" | 22" |
| Dry film thickness Clear Coat (micrometer) | 40 | 40 | 40 | 40 |
| Persoz hardness (1 day) | 149 | 185 | 167 | 250 |
| Persoz hardness (5 days) | 202 | 247 | 236 | 298 |
| Persoz hardness (7 days) | 232 | 267 | 233 | 303 |

TABLE

Persoz hardness for paint example 1, curing at room temperature (±23° C./59% RH)

| | Paint examples with resin examples 3 | | | |
| --- | --- | --- | --- | --- |
| | A Comp | B Comp | C Comp | D Comp |
| spray viscosity | 27" | 26" | 25" | 22" |
| Dry film thickness Clear Coat (micrometer) | 40 | 40 | 40 | 40 |
| Persoz hardness (1 day) | 71 | 167 | 161 | 183 |
| Persoz hardness (5 days) | 95 | 249 | 241 | 247 |
| Persoz hardness (7 days) | 134 | 269 | 265 | 253 |

The comparative modifications A gave haze and C and D showed a strong haze in the drawdowns over glass panels while B resulted in a nice, transparent film.

Paint Example 2

Clear Coat Compositions Based on Resin Example 2

100 parts of each dispersed graft copolymer (example 2A,B,C,D,E,F) were blended, by mechanical mixing, with a polyisocyanate curing agent (equivalent ratio NCO:OH=1.1/1). The polyisocyanate curing agent was prepared by mixing 40 parts n-butylglycolacetate and 60 parts Desmodur® N3900 (1,6-hexamethylenediisocyanate trimer, 100% solids, from Bayer). The mixtures were diluted to spray viscosity (25-27 seconds) by adding de-mineralised water. The solid content of the final clear coat compositions was about 34% (DIN EN ISO 2431 DIN 4 cup, 20° C.).

The clear coat compositions were sprayed over a commercially available water-borne basecoat (Imron® Hydro Basecoat RAL 9004) applied to steel panels pre-coated with a commercial primer-surfacer. The basecoat layers have been flashed off till they became flat at room temperature (approximately 30 minutes) before application of the clear coats. The clear coats were applied at 45% relative humidity at 22° C., via 2 cross coats with a Devilbiss HVLP spray gun (GTI 110-trans Tech, nozzle 1.6, with suction feed), resulting in a dry film thickness of 40-50 p.m. After application of the clear coat compositions the coatings were dried at room temperature or baked for 15 minutes at 60° C. after that these panels were flashed off for 15 minutes. Drying performance and appearance were evaluated.

For evaluation of Persoz hardness, the clear coat compositions were sprayed on glass panels (in analogy to paint example 1). After application of the clear coat compositions, the coatings were dried at room temperature or baked for 15 minutes at 60° C. Then the panels were flashed off for 30 minutes.

TABLE

Curing 15 minutes at 60° C.

Paint examples 2 based on resin examples 5

|  | A Comp | B Comp | C Comp | D Comp | E Comp |
|---|---|---|---|---|---|
| spray viscosity | 26" | 24" | 23" | 20" | 15" |
| Dry film thickness Clear Coat (micrometer) | 50 | 50 | 52 | 60 | Immediately gelling |
| Dust free time | imm | imm | imm | imm | |
| Tack free time | imm | imm | imm | imm | |
| gloss 20° | 74 | 83.8 | 69.2 | 75 | |
| DOI | 74.2 | 77.8 | / | / | |
| du | 39.2 | 31.5 | >40 | >40 | |
| Persoz hardness (1 day) | 318 | 235 | 240 | 245 | |
| Persoz hardness (7 days) | 313 | 282 | 280 | 254 | |
| Persoz hardness (14 days) | 328 | 295 | 265 | 235 | |

Imm = immediately

TABLE

Curing at room temperature (±20° C./38% RH)

Paint examples 2 based on resin examples 5

|  | A Comp | B | C Comp | D Comp | E Comp |
|---|---|---|---|---|---|
| spray viscosity | 26" | 24" | 23" | 20" | 15" |
| Dry film thickness Clear Coat (micrometer) | 50 | 50 | 52 | 60 | Immediately gelling |
| Dust free time | 1 h 30' | 1 h 15' | 1 h 15' | 1 h 15' | |
| Tack free time | 3 h 45' | 3 h 45' | 3 h 45' | 3 h 45' | |
| gloss 20° | 64.9 | 78.7 | 53.6 | 46.6 | |
| DOI | / | 76.5 | / | / | |
| du | >40 | 33.2 | >40 | >40 | |
| Persoz hardness (1 day) | 273 | 186 | 213 | 214 | |
| Persoz hardness (7 days) | 286 | 245 | 294 | 274 | |
| Persoz hardness (14 days) | 336 | 272 | 311 | 287 | |

The above results clearly show that the neutralizing amine according to the invention gives an excellent balance of pot-life and appearance compared with neutralizing amines of prior art.

Test Methods:

Persoz hardness: The change in film hardness of the coating was measured with respect to time by using a Persoz hardness tester supplied by Braive Instruments (Belgium). The number of oscillations (referred to as Persoz number) was recorded. The clear coat compositions were applied on a glass panel, baked 30 minutes at 60° C. and the hardness was measured on a regularly basis at a fixed dry film thickness.

Viscosity: the spray viscosity of the activated clear coat compositions was measured in seconds according to DIN EN ISO 2431 DIN 4 cup, 20° C.

Dry film thickness: Equipment used is from "Braive Instruments" (Belgium). Accuracy: 0.0001 mm Dust free time (in minutes): Dust free time characterizes the point in the drying process when a plush of cotton fibers can be rubbed over or nudged on the film without leaving one of the fibers on the paint surface.

Tack free time (in minutes): Tack free time was measured according to ASTM D1640, p. 273. A film is considered to have dried "tack-free", when the tack tester tips over immediately on removing a 300 gram weight allowed to act for 5 seconds on the counter-weighted metal square base fitted with masking tape and aluminum foil.

Gloss: measured with the micro-TRI-gloss from BYK Gardner. The reflected light is measured at 20°.

Dullness: measured with a Wave-scan DOI apparatus from BYK Gardner. Structures smaller than 0.1 mm influence visual perception and therefore, the wave-scan DOI measures with a CCD camera the diffused light caused by these fine structures. The parameter measured in this way is referred as the "dullness" of the coating. A low value for dullness is preferred, with 1 as minimum.

Distinctness of Image (DOI): measured with a Wave-scan-DOI apparatus from BYK Gardner. The DOI of a clear coat can also be described in terms such as brilliance, sharpness or clarity. The more distinct the reflection of an object on the surface, the more brilliant the coating film will appear. A high value is requested with a maximum of 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A water-based coating composition comprising:
   at least one cross-linkable water-reducible binder having acid functional groups and functional groups with active hydrogen,
   at least one polyisocyanate cross-linking agent with free isocyanate groups, and
   water,
   wherein the acid functional groups of the at least one cross-linkable water-reducible binder are at least partly neutralized with at least one neutralizing agent, the neutralizing agent comprising a monoamine having a secondary amino group attached to a tertiary carbon atom.

2. The water-based coating composition of claim 1, wherein the monoamine having a secondary amino group attached to a tertiary carbon atom is a reaction product of at least one monoamine having a primary amino group attached to a tertiary carbon atom and a mono-unsaturated compound.

3. The water-based coating composition of claim 2, wherein the monoamine having a primary amino group attached to a tertiary carbon atom has a number average molecular weight of about 73 to about 1000.

4. The water-based coating composition of claim 2, wherein said monoamine having a primary amino group attached to a tertiary carbon atom is tert-butylamine.

5. The water-based coating composition of claim 2, wherein the mono-unsaturated compound comprises acrylates, methacrylates, maleates, fumarates and/or itaconates.

6. The water-based coating composition of claim 1, wherein the monoamine having a secondary amino group attached to a tertiary carbon atom is a reaction product of at least one monoamine having a primary amino group attached to a tertiary carbon atom and a mono-epoxide compound.

7. The water-based coating composition of claim 6, wherein the mono-epoxide compound has 2 to 33 carbon atoms.

8. The water-based coating composition of claim 1, wherein the neutralizing agent comprises 2-(tert-butylamino) ethanol.

9. The water-based coating composition of claim 1, wherein the functional groups with active hydrogen are hydroxyl groups.

10. The water-based coating composition of claim 1, wherein the at least one cross-linkable water-reducible binder has an acid value of about 10 to about 150 mg KOH/g.

11. The water-based coating composition of claim 1, wherein the acid groups of the at least one water-reducible binder are neutralized with said neutralizing agent according to a neutralization degree of about 60 to about 140%.

12. The water-based coating composition of claim 1, wherein the water-based coating composition is a clear coat coating composition.

13. The water-based coating composition of claim 1 further comprising at least one organic solvent.

14. A method for producing an automotive coating, the method comprising;
    applying onto a substrate a water-based coating composition comprising:
        at least one cross-linkable water-reducible binder having acid functional groups and functional groups with active hydrogen,
        at least one polyisocyanate cross-linking agent with free isocyanate groups, and
        water, wherein the acid functional groups of the at least one cross-linkable water-reducible binder are at least partly neutralized with at least one neutralizing agent, the neutralizing agent comprising a monoamine having a secondary amino group attached to a tertiary carbon atom; and
    curing the water-based coating composition.

15. The method of claim 14 wherein the water-based coating composition further comprises an organic solvent, and wherein the method further comprises flashing off the water-based coating composition to remove at least a portion of the water and the organic solvent.

16. The method of claim 14 wherein curing the water-based coating composition comprises baking or irradiating with IR radiation.

17. The method of claim 14 wherein the substrate is a color-imparting and/or special effect-imparting pre-dried base coat layer.

18. The method of claim 14 wherein the substrate is an uncoated metal or plastic substrate.

19. An aqueous binder dispersion comprising at least one water-reducible binder having acid functional groups and functional groups with active hydrogen, wherein said acid functional groups of the at least one water-reducible binder are at least partly neutralized with a neutralizing agent, the neutralizing agent comprising a monoamine having a secondary amino group attached to a tertiary carbon atom.

20. The aqueous binder dispersion of claim 19, wherein the monoamine having a monoamine having a secondary amino group attached to a tertiary carbon atom is a reaction product of at least one monoamine having a primary amino group attached to a tertiary carbon atom and a mono-unsaturated compound and/or a reaction product of at least one monoamine having a primary amino group attached to a tertiary carbon atom and a mono-epoxide compound.

* * * * *